US012586900B2

(12) United States Patent
Lu et al.

(10) Patent No.: US 12,586,900 B2
(45) Date of Patent: Mar. 24, 2026

(54) FEED NETWORK AND ANTENNA

(71) Applicant: Outdoor Wireless Networks LLC, Claremont, NC (US)

(72) Inventors: Jianpeng Lu, Jiangsu (CN); Hangsheng Wen, Jiangsu (CN); Ligang Wu, Jiangsu (CN)

(73) Assignee: Outdoor Wireless Networks LLC, Richardson, TX (US)

(*) Notice: Subject to any disclaimer, the term of this patent is extended or adjusted under 35 U.S.C. 154(b) by 198 days.

(21) Appl. No.: 18/650,506

(22) Filed: Apr. 30, 2024

(65) Prior Publication Data

US 2024/0283148 A1 Aug. 22, 2024

Related U.S. Application Data

(63) Continuation of application No. 18/050,614, filed on Oct. 28, 2022, now Pat. No. 12,003,036, which is a (Continued)

(30) Foreign Application Priority Data

Aug. 27, 2018 (CN) ......................... 201810977339.5

(51) Int. Cl.
*H01Q 3/32* (2006.01)
*H01Q 1/24* (2006.01)
*H01Q 19/10* (2006.01)

(52) U.S. Cl.
CPC ............... *H01Q 3/32* (2013.01); *H01Q 1/246* (2013.01); *H01Q 19/108* (2013.01)

(58) Field of Classification Search
CPC ......... H01Q 1/246; H01Q 3/32; H01Q 19/108
See application file for complete search history.

(56) References Cited

U.S. PATENT DOCUMENTS 7,298,233 B2 11/2007 Zimmerman
8,674,788 B2 3/2014 Le
(Continued)

FOREIGN PATENT DOCUMENTS

CN 210926307 U 7/2020
WO 2017177927 A1 10/2017
(Continued)

OTHER PUBLICATIONS

International Search Report and the Written Opinion of the International Searching Authority corresponding to International Patent Application No. PCT/US2019/045605 (8 pages) (mailed Nov. 1, 2019).

*Primary Examiner* — Daniel Munoz
(74) *Attorney, Agent, or Firm* — Myers Bigel, P.A.

(57) ABSTRACT

A feed network includes an adjustable electromechanical phase shifter that comprises a main printed circuit board and a phase shifting unit. The adjustable electromechanical phase shifter is configured to shift the phase of an RF signal that is input to the feed network and provide the phase shifted RF signal to at least one radiating element that is positioned on a first side of a reflector of an antenna, where the phase shifting unit is formed on the surface of a first side of the main printed circuit board, and the first side of the main printed circuit board is a side that is closer to the at least one radiating element, and the main printed circuit board is positioned on the first side of the reflector.

22 Claims, 5 Drawing Sheets

Related U.S. Application Data continuation of application No. 17/259,337, filed as application No. PCT/US2019/045605 on Aug. 8, 2019, now Pat. No. 11,489,254.

(56) References Cited

U.S. PATENT DOCUMENTS

| | | | | |
|---|---|---|---|---|
| 9,431,703 | B1 | 8/2016 | Dandlberger et al. | |
| 11,283,160 | B2 | 3/2022 | Li et al. | |
| 2009/0213020 | A1 | 8/2009 | Rentz et al. | |
| 2010/0157858 | A1 | 6/2010 | Lee et al. | |
| 2011/0241954 | A1 | 10/2011 | Le | |
| 2012/0319909 | A1 | 12/2012 | Irmscher et al. | |
| 2018/0287255 | A1* | 10/2018 | Zimmerman | H01Q 3/08 |
| 2022/0006167 | A1* | 1/2022 | P | H01Q 21/08 |

FOREIGN PATENT DOCUMENTS

| | | | |
|---|---|---|---|
| WO | 2019222008 | A1 | 11/2019 |
| WO | 2021108182 | A1 | 6/2021 |

* cited by examiner

FEED NETWORK AND ANTENNA

CROSS-REFERENCE TO RELATED APPLICATIONS

The present application is a continuation application of U.S. patent application Ser. No. 18/050,614, filed Oct. 28, 2022, which is a continuation application of U.S. patent application Ser. No. 17/259,337, filed Jan. 11, 2021, which is a 35 USC § 371 US national stage application of PCT/US2019/045605, filed Aug. 8, 2019, which claims the benefit of and priority to Chinese Patent Application No. 201810977339.5, filed Aug. 27, 2018, the contents of which are incorporated herein by reference.

FIELD OF THE INVENTION

The present disclosure generally relates to communications systems and, more particularly, feed networks for antennas.

BACKGROUND

A base station antenna may include a radiating element, a phase shifter, an electrical tilt control unit and a reflector. In order to reduce interference, the radiating element is disposed on a first side (e.g., the upper side) of the reflector, while the phase shifter and the electrical tilt control unit are disposed on a second side (e.g., the lower side) of the reflector. The radiating element may be coupled to the phase shifter through a jumper cable.

SUMMARY

According to a first aspect of the present invention, a feed network is provided. The feed network may comprise: an adjustable electromechanical phase shifter that comprises a main printed circuit board and a phase shifting unit, where the adjustable electromechanical phase shifter is configured to shift the phase of a radio frequency ("RF") signal that is input to the feed network and provide the phase shifted RF signal to at least one radiating element that is positioned on a first side of a reflector of an antenna. The phase shifting unit is formed on the surface of a first side of the main printed circuit board, where the first side of the main printed circuit board is a side that is closer to the at least one radiating element, and the main printed circuit board is positioned on the first side of the reflector.

According to a second aspect of the present invention, an antenna is provided. The antenna may comprise a reflector, a feed network and at least one radiating element that is positioned on a first side of the reflector, where the feed network comprises an adjustable electromechanical phase shifter that includes a main printed circuit board and a phase shifting unit. The adjustable electromechanical phase shifter is configured to shift the phase of an RF signal that is input to the feed network and provide the phase shifted RF signal to the at least one radiating element. The phase shifting unit is formed on the surface of a first side of the main printed circuit board, where the first side of the main printed circuit board is a side that is closer to the at least one radiating element, and the main printed circuit board is positioned on the first side of the reflector.

Figure 1:
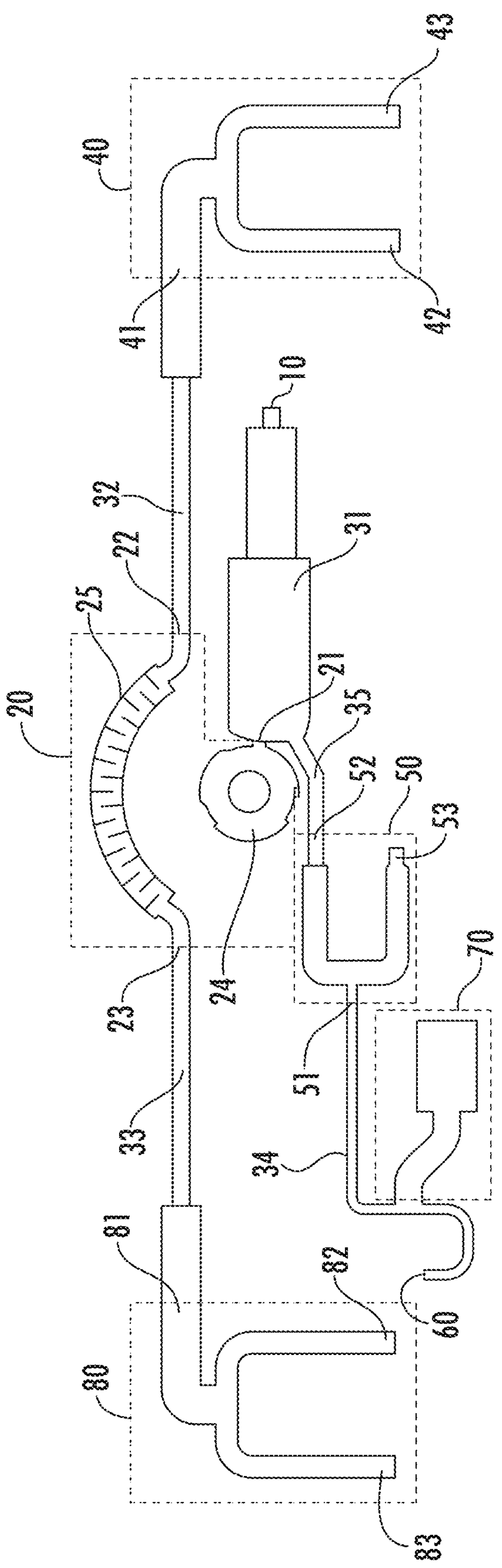
FIG. 1 schematically illustrates a configuration of a feed network according to an exemplary embodiment of the present invention.

in some cases the same elements or elements having similar functions are denoted by the same reference numerals in different drawings, and description of such elements is not repeated. In some cases, similar reference numerals and letters are used to refer to similar elements, and thus once an element is defined in one figure, it need not be further discussed with reference to subsequent figures.

In order to facilitate understanding, the position, size, range, or the like of each structure illustrated in the drawings may not be drawn to scale. Thus, the disclosure is not necessarily limited to the position, size, range, or the like as disclosed in the drawings.

DETAILED DESCRIPTION

The present invention will be described with reference to the accompanying drawings, which show a number of example embodiments thereof. It should be understood, however, that the present invention can be embodied in many different forms, and is not limited to the embodiments described below. Rather, the embodiments described below are intended to make the disclosure of the present invention more complete and fully convey the scope of the present invention to those skilled in the art. It should also be understood that the embodiments disclosed herein can be combined in any way to provide many additional embodiments. For the sake of brevity and/or clarity, well-known functions or structures may be not described in detail.

Herein, when an element is described as located "on" "attached" to, "connected" to, "coupled" to or "in contact with" another element, etc., the element can be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element can mean that the first element has a part that overlaps the second element or a part that is located above or below the second element.

Herein, terms such as "upper", "lower", "left", "right", "front", "rear", "high", "low" may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being "below" a second feature can be then described as being "above" the second feature. The device may be oriented otherwise (rotated 90 degrees or at other orientation), and the relative spatial relationship between the features will be correspondingly interpreted.

Herein, the term "A or B" used through the specification refers to "A and B" and "A or B" rather than meaning that A and B are exclusive, unless otherwise specified The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the detailed description.

Herein, the term "substantially", is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

Herein, certain terminology, such as the terms "first", "second" and the like, may also be used in the following description for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, steps, operations, elements, and/or components, but do not preclude the presence or addition of one or more other features, steps, operations, elements, components, and/or groups thereof.

Figure 2:
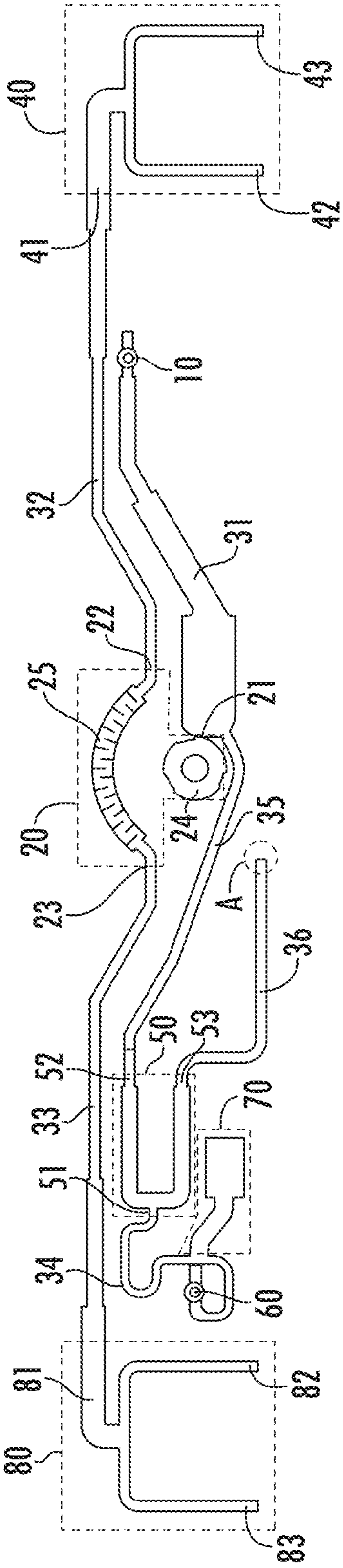
FIG. 2 schematically illustrates a configuration of a feed network according to another exemplary embodiment of the present invention.

Referring to FIGS. 1 and 2, a feed network according to an exemplary embodiment of the present invention is shown. The feed network includes an adjustable electromechanical phase shifter including a main printed circuit board (not shown, refer to reference numeral 2 in FIGS. 4 and 5), a phase shifting unit 20 formed on the main printed circuit board, and a wiper arm printed circuit board (not shown, refer to reference numeral 3 in FIGS. 4 and 5). The adjustable electromechanical phase shifter is configured to shift the phase of an RF signal that is input to the feed network and provide the phase shifted RF signal to at least one radiating element (not shown, refer to reference numeral 6 in FIGS. 4 and 5) of an antenna.

The phase shifting unit 20 is printed on the surface of a first side of the main printed circuit board, wherein the first side of the main printed circuit board is a side that is closer to the at least one radiating element, and the main printed circuit board and the at least one radiating element are positioned on a first side of a reflector (not shown, refer to reference numeral 1 in FIGS. 4 and 5) of the antenna. For example, in the antenna shown in FIG. 4 and in the view direction shown in FIG. 4, the phase shifting unit 20 is printed on the surface of the upper side of the main printed circuit board, and the main printed circuit board and the at least one radiating element are all located on the upper side of the reflector 1. For example, in the antenna shown in FIG. 5, the phase shifting unit 20 is printed on the surface of the outer side of the main printed circuit board, and the main printed circuit board and the at least one radiating element are all located on the outer side the reflector 1.

The feed network further includes an RF signal input port 10, a phase shifting unit 20, power dividing units 40, 50, 80, conductive traces 31, 32, 33, 34, 35, a low-pass filter 70, and a direct current signal (and/or low frequency signal) output port 60. Each of these elements of the feed network may be formed on the surface of the first side of the main printed circuit board.

The RF signal input port 10 is configured to receive an RF signal from, for example, a radio. The first conductive trace 31 couples the RF signal input port to the phase shifting unit 20 so as to pass the RF signal to the phase shifting unit 20. The phase shifting unit 20 includes an inlet 21 that is configured to input an RF signal into a central coupling region 24, the central coupling region 24, a phase shifting circuit 25, a first outlet 22, and a second outlet 23. As will be understood by those of skill in the art, a wiper arm printed circuit board may be pivotally mounted to the main printed circuit board in the central coupling region 24. An RF signal input at the inlet 21 may pass to the wiper arm printed circuit board and may be passed back to the phase shifting circuit 25 on the main printed circuit board. The RF signal may be split into two sub-components as it is passed to the phase shifting circuit 25. The phase shifting circuit 25 may be configured to shift the respective phases of the two sub-components of the RF signal and to pass the phase shifted sub-components of the RF signal to the first outlet 22 and the second outlet 23, respectively. The first outlet 22 and the second outlet 23 are configured to output the respective sub-components of the phase-shifted RF signals. The sub-components of the phase-shifted RF signals that are output through the first outlet 22 and the second outlet 23 are fed to the at least one radiating element.

The first power dividing unit 40 is a three-port network that includes a first port 41, a second port 42 and a third port 43, and the second power dividing unit 80 is also a three-port network that includes a first port 81, a second port 82 and a third port 83. The second conductive trace 32 couples the first outlet 22 to the first port 41 of the first power dividing unit 40 so that the second port 42 and the third port 43 of the first power dividing unit 40 feed the first sub-component of the phase-shifted RF signal to a first radiating element and a second radiating element, respectively. The third conductive trace 33 couples the second outlet 23 to the first port 81 of the second power dividing unit 80, so that the second port 82 and the third port 83 of the second power dividing unit 80 feed the second sub-component of the phase-shifted RF signal to a third radiating element and a fourth radiating element, respectively. The at least one radiating element may comprise, for example, a linear array of radiating elements of an antenna. Those skilled in the art should appreciate that the first power dividing unit 40 and the second power dividing unit 80 may each include more than two ports, and may also be other suitable sorts of power dividing units not limited to T-junction power dividers, Wilkinson power dividers, etc.

To reduce interference at the radiating elements, some components of a conventional feed network (e.g., a phase shifting unit, a power dividing unit and the like) may be formed on the surface of a second side (e.g., a side that is far away from the radiating elements) of a main printed circuit board where the radiating elements are located on a first side of a reflector of the antenna and the main printed circuit board is located on a second side of the reflector. The feed network feeds RF signals that are to be transmitted by the antenna to the radiating elements, which are located on the first side of the reflector, through jumper cables. Since the feed network according to embodiments of the present invention may be formed on the surface of the first side (e.g., a side that is closer to the radiating elements) of the main printed circuit board, and the main printed circuit board and the radiating elements are all located on the first side of the reflector, space on the second side of the reflector may be saved, which is advantageous for miniaturization of the antenna. Moreover, in the feed network according to embodiments of the present invention, the electrical coupling between various portions of the feed network is achieved with conductive traces instead of using jumper cables, which is beneficial to reducing interference to the radiating elements and which may also reduce the number of locations where passive intermodulation distortion (PIM) may be generated.

In addition, since the main printed circuit board and the at least one radiating element are both located on the first side of the reflector, the conductive traces on the main printed circuit board may radiate RF energy outwardly, and the radiated energy may affect the at least one radiating element. To reduce RF energy radiating from the conductive traces on the main printed circuit board, at least one of the following measures may be taken: providing metallized vias, for example, the metallized vias may be provided in the main printed circuit board at a position that is close to a portion of a conductive trace in the feed network, where a current with a value greater than a threshold may flow through the portion of the conductive trace; increasing the area of the reference ground, for example, in the case that the conductive traces are printed on the first surface of the main printed circuit board and a grounded conductor is printed on the second surface of the main printed circuit board, an additional conductor may be printed on the first surface of the main printed circuit board, and the additional conductor printed on the first surface of the main printed circuit board may be electrically connected to the grounded conductor printed on the second surface of the main printed circuit board.

In some embodiments, the feed network is further configured to feed another sub-component of the RF signal that is input at RF signal input port 10 to a fifth radiating element of the antenna. For example, in some embodiments, the feed network may feed a sub-component of the RF signal that is input at RF signal input port 10 to the fifth radiating element via the RF signal input port 10, the first conductive trace 31 and a fifth conductive trace 35. A first end of the first conductive trace 31 is coupled to the RF signal input port 10, and a first end of the fifth conductive trace 35 is coupled to a second end of the first conductive trace 31. The second end of the fifth conductive trace 35 may feed the sub-component of the RF signal to the fifth radiating element.

In some embodiments, the feed network may feed power to the fifth radiating element via the RF signal input port 10, the first conductive trace 31, the fifth conductive trace 35 and the third power dividing unit 50. As shown in FIGS. 1 and 2, the third power dividing unit 50 is also a three-port network that includes a first port 51, a second port 52 and a third port 53. The second port 52 of the third power dividing unit 50 is coupled to the second end of the fifth conductive trace 35, and the third port 53 of the third power dividing unit 50 is coupled to the fifth radiating element, so that the feed network may feed power to the fifth radiating element. Those skilled in the art should appreciate that the third power dividing unit 50 may further include more ports, and may also be other suitable sorts of power dividing units not limited to a T-junction power divider, a Wilkinson power divider, etc.

In some embodiments, the feed network may further be configured to output a direct current signal and/or a low frequency signal. The RF signal input port 10 is further configured to input a direct current (or low frequency) signal, for example, together with an RF signal, to the feed network. The low-pass filter 70 is configured to filter at least part of a signal that is input to the feed network at the RF signal input port 10 to pass the direct current signal (and/or low frequency signal) to the direct current signal output port 60. The direct current signal output port 60 outputs the direct current signal (and/or low frequency signal) from the feed network. A first end of the fourth conductive trace 34 is coupled to the first port 51 of the third power dividing unit 50, and a second end of the fourth conductive trace 34 is coupled to the direct current signal output port 60. The low-pass filter 70 is coupled to the fourth conductive trace 34 between the first end and the second end of the fourth conductive trace 34 such that the second end of the fourth conductive trace 34 outputs any direct current signal or low frequency signal to the direct current signal output port 60.

The feed network according to embodiments of the present invention may pass signals from the RF signal input port 10 to the third power dividing unit 50 via the first conductive trace 31 and the fifth conductive trace 35. After power dividing by the third power dividing unit 50, a first portion of the signals is passed to the low-pass filter 70 via the fourth conductive trace 34. The low-pass filter 70 filters the signals and passes any direct current signal and/or low frequency signal in the first portion of the signals to the direct current signal output port 60 via the fourth conductive trace 34, such that the direct current signal and/or low frequency signal may be utilized, for example, directly by an electrical tilt control unit of the antenna without any additional processing. A second portion of the signals is fed to one or more radiating elements of the antenna via the third port 53 of the third power dividing unit 50. The low-pass filter 70 shown in the drawings is merely an example, and those skilled in the art should appreciate that the low-pass filter 70 can be any low-pass filter with an appropriate structure, such as an elliptic function filter, a step impedance resonator, etc. By appropriately designing the fourth conductive trace 34 and the low-pass filter 70 and other components, the amount of isolation between the direct current signal (and/or low frequency signal) output by the feed network and the RF signal transmitted in the feed network may meet a design requirement such as, for example, greater than 50 dB of isolation.

In some embodiments, as shown in FIGS. 1 and 2, the first outlet 22, the second conductive trace 32 and the first power dividing unit 40 are all located on a first side of the phase shifting unit 20 (e.g., in the direction shown in the drawings, on the right side of the phase shifting unit 20), and the second outlet 23, the third conductive trace 33 and the second power dividing unit 80 are all located on a second side of the phase shifting unit 20 (e.g., in the direction shown in the drawings, on the left side of the phase shifting unit 20) that is opposite the first side. In these embodiments, the first power dividing unit 40 and the second power dividing unit 80 in the feed network are arranged on the two opposite sides of the phase shifting unit 20, and therefore interference between the first power dividing unit 40 (together with the second conductive trace 32) and the second power dividing unit 80 (together with the third conductive trace 33) may be reduced, and simultaneously the structure of the feed network may be made more compact and the outputs of the feed network may be located close to the radiating elements to which the outputs may be coupled. Those skilled in the art may appreciate that the drawings are merely exemplary, in the direction shown in the drawings, the first side may also be the left side, the upper side or the lower side of the phase shifting unit 20, and the second side may also be correspondingly the right side, the lower side or the upper side of the phase shifting unit 20.

Figure 3:
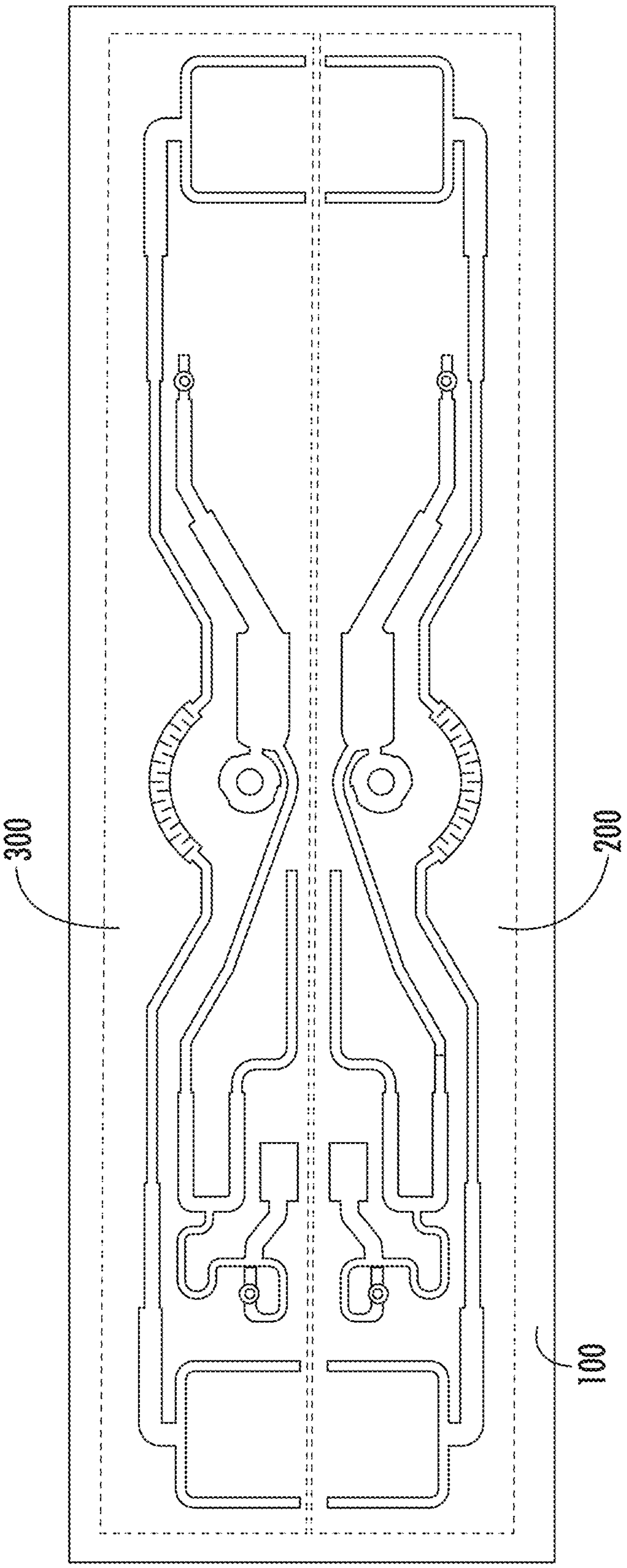
FIG. 3 schematically illustrates a configuration of part of an antenna according to another exemplary embodiment of the present invention.

In some embodiments, as shown in FIGS. 1 and 2, the inlet 21 of the phase shifting unit 20, the first conductive trace 31 and the RF signal input port 10 are all located on the first side of the phase shifting unit 20. Through such layout, the structure of the feed network may be more compact, which is advantageous for saving space. In addition, two feed networks may sometimes be arranged opposite to each other, e.g., back to back, in an antenna, as shown in FIG. 3. The inlet 21, the first conductive trace 31 and the RF signal input port 10 are arranged on the first side of the phase shifting unit 20, which not only contributes to save space, but also contributes to reduce interference between the two feed networks. For example, it is conducive to reducing the strength of coupling between the first conductive trace of the first feed network 200 and the first conductive trace of the second feed network 300.

In some embodiments, as shown in FIGS. 1 and 2, the third power dividing unit 50, the fourth conductive trace 34, the low-pass filter 70 and the direct current signal output port 60 are all located on the second side of the phase shifting unit 20 that is opposite the first side. In the embodiment shown in FIG. 2, the fifth conductive trace 35 of the feed network is longer than the fifth conductive trace 35 in the embodiment shown in FIG. 1. The fifth conductive trace 35 couples the third power dividing unit 50 to the first conductive trace 31. Thus, the inlet 21 of the phase shifting unit 20, the first conductive trace 31 and the RF signal input port 10 are arranged on the first side of the phase shifting unit 20, while the third power dividing unit 50, the fourth conductive trace 34, the low-pass filter 70 and the direct current signal output port 60 are arranged on the second side of the phase shifting unit 20 that is opposite the first side, so that the structure of the feed network may be more compact for further saving space.

In some embodiments, the first conductive trace 31 and the second conductive trace 32 on the first side of the phase shifting unit 20 are arranged such that the strength of signal coupling between the first conductive trace 31 and the second conductive trace 32 meets a design requirement, e.g., lower than a first threshold (which may be −20 dB, for example). The third conductive trace 33 and the fourth conductive trace 34 on the second side of the phase shifting unit 20 are arranged such that the strength of signal coupling between the third conductive trace 33 and the fourth conductive trace 34 meets a design requirement, e.g., lower than a second threshold (which may be −20 dB, for example). In this way, the feed network may ensure that the strength of signal coupling between the conductive traces meets design requirements while the structure is compact and the space is saved.

In the feed network according to each of the above embodiments of the present invention, the bends in the conductive traces, the power dividing units, the phase shifting unit, the filter and the like may all be rounded, which may be beneficial to improving the PIM performance of the feed network. Appropriate adjustment of the size of each conductive trace helps to perform impedance matching, so that the return loss performance of the feed network may meet a design requirement.

The feed network according to each of the above embodiments of the present invention not only realizes the function of feeding power to radiating elements of the antenna, but more importantly, multiple functions including feeding the radiating elements, phase shifting, filtering, and providing power directly to an electrical tilt control unit are integrated on a single main printed circuit board, which saves space as compared to conventional feed networks, and is advantageous for miniaturization of the antenna.

FIG. 3 schematically shows a structure of at least part of an antenna according to an exemplary embodiment of the present invention. The antenna includes a plurality of radiating elements (not shown) and feed networks 200 and 300. The feed networks 200 and 300 are formed on a first surface of a main printed circuit board 100, and the radiating elements are located above the upper surface of the main printed circuit board 100. The structures of the feed networks 200 and 300 in the antenna are the same as the structure of the feed network in the embodiments described above thus duplicate description thereof is omitted here.

In some embodiments, the first power dividing unit 40 and the second power dividing unit 80 in each of the feed networks 200 and 300 in the antenna are respectively located on the two opposite sides of the phase shifting unit 20, so that feeding power to the radiating elements arranged along a line becomes easy while the structure of the antenna is compact. In the case of such an arrangement of the first power dividing unit 40 and the second power dividing unit 80, the inlet 21 of the phase shifting unit 20, the first conductive trace 31 and the RF signal input port 10 may be arranged on the first side of the phase shifting unit 20 (for example, in the direction shown in the drawings, on the right side of the phase shifting unit 20), and the third power dividing unit 50, the fourth conductive trace 34, the low-pass filter 70 and the direct current signal output port 60 are arranged on the second side of the phase shifting unit 20 (for example, in the direction shown in the drawings, on the left side of the phase shifting unit 20) that is opposite the first side, so that the structure of the antenna is further compact. Those skilled in the art may appreciate that the drawings are merely exemplary, in the direction shown in the drawings, the first side may also be the left side, the upper side or the lower side of the phase shifting unit 20, and the second side may also be correspondingly the right side, the lower side or the upper side of the phase shifting unit 20.

In some embodiments, as shown in FIG. 3, the first feed network 200 and the second feed network 300 are jointly used for feeding power to the radiating elements. The first feed network 200 and the second feed network 300 may be arranged opposite to each other, e.g., back to back as shown in FIG. 3. The first feed network 200 and the second feed network 300 may be arranged such that the strength of signal coupling between the first feed network 200 and the second feed network 300 meets a design requirement, e.g., lower than a third threshold (may be −20 dB). In the feed network, the inlet 21 of the phase shifting unit 20, the first conductive trace 31 and the RF signal input port 10 are all arranged on the left or right side of the phase shifting unit 20 (in the direction shown in the drawings), instead of being arranged on the upper or lower side of the phase shifting unit 20, so that the structure of the antenna is more compact when the first feed network 200 and the second feed network 300 are arranged back to back, and the interferences between the feed network 200 and the second feed network 300 can be reduced at the same time, for example, the strength of signal coupling between the first conductive trace of the first feed network 200 and the first conductive trace of the second feed network 300 can be reduced.

Figure 4:
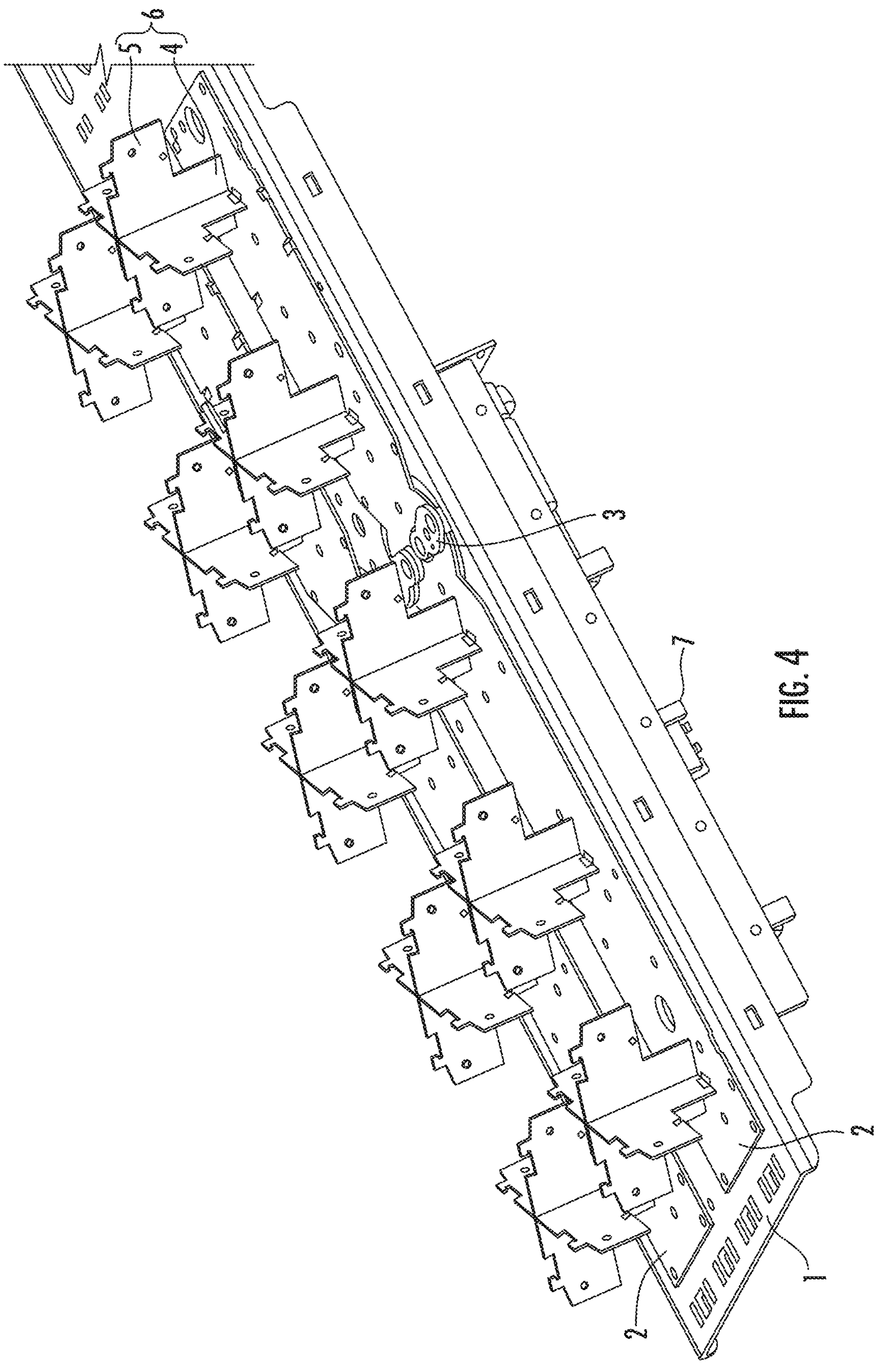
FIG. 4 schematically illustrates a configuration of part of an antenna according to another exemplary embodiment of the present invention.
Figure 5:
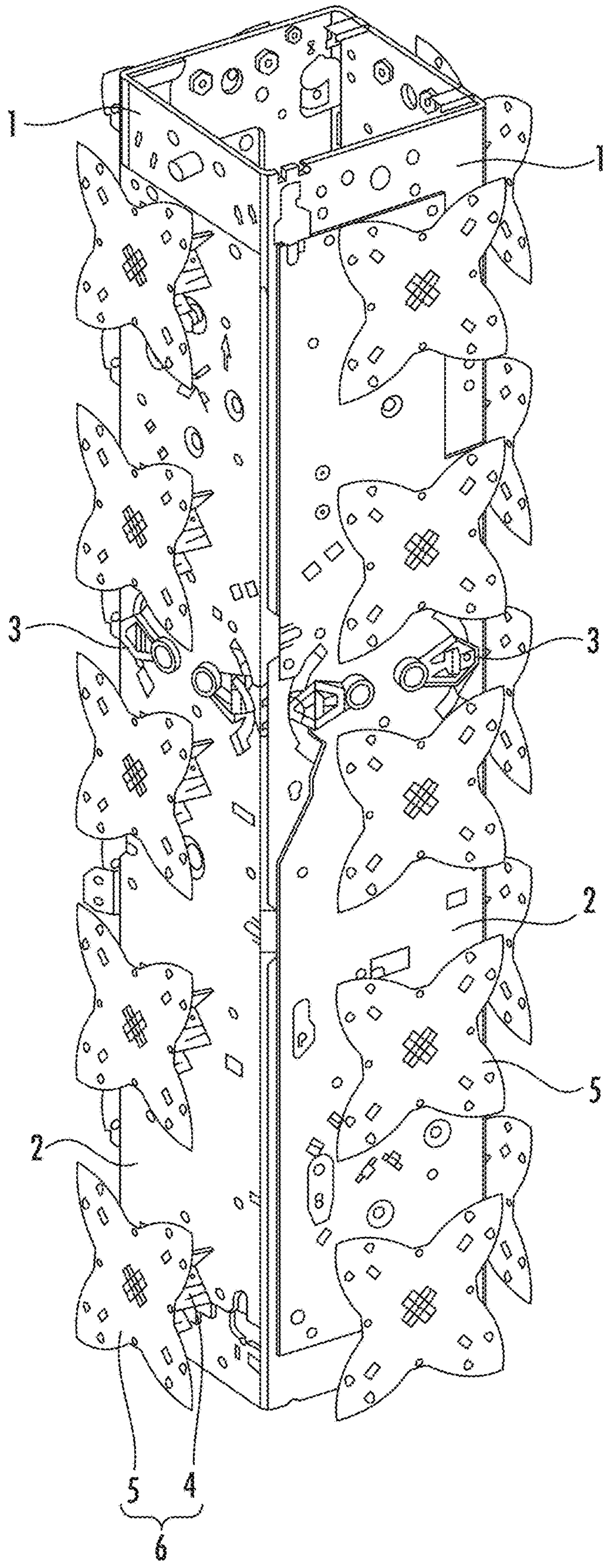
FIG. 5 schematically illustrates a configuration of part of an antenna according to another exemplary embodiment of the present invention.

FIGS. 4 and 5 respectively schematically illustrate at least a portion of an antenna according to exemplary embodiments of the present invention. The antenna includes a reflector 1, a feed network, at least one radiating element 6, and an electrical tilt control unit 7. The feeding network may include an adjustable electromechanical phase shifter that includes a main printed circuit board 2, a wiper arm printed circuit board 3 that is attached to the main printed circuit board 2, and a phase shifting unit (not shown for simplicity, referring to the reference numeral 20 in FIGS. 1 and 2) printed on the surface of a first side of the main printed circuit board 2 wherein the first side of the main printed circuit board 6 is a side that is closer to the at least one radiating element 6. For example, in the antenna shown in FIG. 4 and in the view direction shown in FIG. 4, the phase shifting unit is printed on the surface of the upper side of the main printed circuit board 2, and the main printed circuit board 2 and the at least one radiating element 6 are all located on the upper side of the reflector 1. For example, in the antenna shown in FIG. 5, the phase shifting unit is printed on the surface of the outer side of the main printed circuit board 2, and the main printed circuit board 2 and the at least one radiating element 6 are all located on the outer side the reflector 1.

Each of the radiating elements 6 may be coupled to the feed network, for example, coupled to a respective port of the power dividing unit without the use of a jumper cable. Each of the at least one radiating element 6 comprises a radiator 5 and a feed stalk 4, wherein the radiator 5 is mounted to the main printed circuit board 2 through the feed stalk 4. For example, the radiator 5 of the radiating element 6 is mounted to the feed stalk 4, and the feed stalk 4 is mounted (for example by welding) to the main printed circuit board 2. In addition, conductors in the radiator 5 are also coupled to the feed network through conductors in the feed stalk 4, so that the feed network may feed RF signals that are to be transmitted by the antenna to the radiator 5. For example, referring again to FIG. 2, if a radiating element 6 of a linear array of radiating elements of the antenna is arranged in a position corresponding to the area A, the radiating element 6 may be coupled to the third port 53 of the third power dividing unit 50 through a sixth conductive trace 36 in the feed network. The sixth conductive trace 36 may extend to the area A corresponding to the desired mounting position for the radiating element 6, such that the radiating element 6 may be directly mounted onto the main printed circuit board 2 (e.g., by welding the end of the feed stalk 4 of the radiating element 6 far away from the radiator 5 directly onto the main printed circuit board 2), and the third port 53 of the third power dividing unit 50 feeds power to the radiator 5 through the sixth conductive trace 36 and the feed stalk 4. Those skilled in the art should appreciate that the second port 42 and the third port 43 of the first power dividing unit 40 as well as the second port 82 and the third port 83 of the second power dividing unit 80 as shown in FIGS. 1 and 2 may also extend to areas (not shown) corresponding to desired mounting positions for the first, second, third and fourth radiating elements through conductive traces (not shown) formed on the upper surface of the main printed circuit board 100, so that the ports of the power dividing units may feed power to the radiators of the corresponding radiating elements through these conductive traces and the feed stalks of respective radiating elements. In this way, the feed network may feed power to the radiating elements without jumper cables, thereby reducing interference to the radiating elements.

In some embodiments, the antenna of the present invention further includes an electrical tilt control unit 7 that is positioned on a second side of the reflector 1 that is opposite the first side, wherein the electrical tilt control unit 7 is configured to control movement of the wiper arm printed circuit board 3. Referring to FIGS. 1 and 2, the feed network may provide a direct current signal (and/or a low frequency signal) to the electrical tilt control unit for the operation thereof through the RF signal input port 10, the first conductive trace 31, the fifth conductive traces 35, the third power dividing units 50, the fourth conductive traces 34, the low-pass filters 70 and the direct current signal output ports 60 therein.

Although some specific embodiments of the present invention have been described in detail with examples, it should be understood by a person skilled in the art that the above examples are only intended to be illustrative but not to limit the scope of the present invention. The embodiments disclosed herein can be combined arbitrarily with each other, without departing from the scope and spirit of the present invention. It should be understood by a person skilled in the art that the above embodiments can be modified without departing from the scope and spirit of the present invention. The scope of the present invention is defined by the attached claims.

That which is claimed is:

1. A feed network, comprising:

a printed circuit board providing at least part of the feed network;

an electromechanical phase shifter that comprises a phase shifting circuit having an arcuate portion residing between longitudinally spaced apart first and second outlets that merge into respective first and second conductive traces provided on a front surface of the printed circuit board and a wiper arm that resides in front of the printed circuit board and cooperates with the arcuate portion; and a plurality of radiating elements projecting forward of the printed circuit board, wherein the first and second conductive traces merge into first and second power dividers provided on the front surface of the printed circuit board, and wherein the electromechanical phase shifter is configured to shift a phase of a radio frequency ("RF") signal that is input to the feed network and provide the phase shifted RF signal to respective radiating elements.

2. The feed network of claim 1, wherein the wiper arm is provided as a printed circuit board wiper arm.

3. The feed network of claim 1, further comprising a low pass filter provided, at least in part, on the front surface of the printed circuit.

4. The feed network of claim 1, further comprising a reflector residing behind the printed circuit board.

5. The feed network of claim 1, wherein the feed network comprises first and second feed networks, both positioned on the printed circuit board, wherein the phase shifting circuit is a first phase shifting circuit of the first feed network, the electromechanical phase shifter further comprising a second phase shifting circuit of the second feed network, the second phase shifting circuit having an arcuate portion residing between longitudinally spaced apart first and second outlets that merge into respective first and second conductive traces provided on the front surface of the printed circuit board and a wiper arm that resides in front of the printed circuit board and cooperates with the second phase shifting circuit, wherein the arcuate portion of the first phase shifting circuit is laterally spaced apart from the arcuate portion of the second phase shifting circuit, and wherein an inner end portion of the wiper arm of the first phase shifting circuit is adjacent an inner end portion of the wiper arm of the second phase shifting circuit.

6. The feed network of claim 1, further comprising a plurality of additional radiating elements that project forward of the printed circuit board, coupled to the feed network and the electromechanical phase shifter, wherein ports of the first and second power dividers are configured to feed power to radiators of corresponding radiating elements without jumper cables.

7. The feed network of claim 1, wherein the first and second conductive traces are linear traces that extend longitudinally in opposing directions from the arcuate portion, wherein the first power divider comprises first, second, and third ports, and wherein the first port is connected to the second port and the third port by a conductive trace segment that bends from the first conductive trace, then splits into first and second conductive trace segments that are parallel and spaced apart to terminate at corresponding second and third ports.

8. The feed network of claim 1, wherein the feed network is arranged in a base station antenna comprising a reflector, wherein the printed circuit board resides in front of the reflector, and wherein the arcuate portion projects laterally outward and extends in a longitudinal direction of the base station antenna to position the first port above the and second port.

9. The feed network of claim 1, wherein the printed circuit board is arranged in a base station antenna, wherein the printed circuit board is provided as a first printed circuit board and the electromechanical phase shifter is provided as a first electromechanical phase shifter in the base station antenna, and wherein the feed network further comprises:

a second printed circuit board;

a second electromechanical phase shifter that comprises a second phase shifting circuit that is provided on a front surface of the second printed circuit board; and a second wiper arm that resides in front of the second printed circuit board and cooperates with the second phase shifting circuit, wherein the first and second printed circuit boards are co-planar and reside side-by-side, each with a plurality or radiating elements projecting forward thereof.

10. The feed network of claim 9, wherein the first printed circuit board and the second printed circuit board reside in front of a reflector.

11. The feed network of claim 9, wherein the first printed circuit board and the second printed circuit board are coupled to a reflector, and wherein the feed network further comprises a tilt control unit coupled to the first and second wiper arms.

12. An antenna, comprising:

a printed circuit board, wherein the printed circuit board has a front configured to provide at least part of a feed network comprising a phase shifting circuit, wherein the phase shifting circuit comprises an arcuate portion with a first end portion providing a first outlet, a second end portion spaced apart from the first end portion and providing a second outlet, and a wiper arm printed circuit board pivotably coupled to and residing in front of the arcuate portion of the phase shifting circuit; and at least one radiating element that projects forward of the printed circuit board and is coupled to the feed network, wherein the phase shifting circuit and the wiper arm printed circuit board form an electromechanical phase shifter that is configured to shift a phase of a radio frequency ("RF") signal that is input to the feed network and provide the phase shifted RF signal to the at least one radiating element.

13. The antenna of claim 12, wherein the at least one radiating element comprises a plurality of radiating elements that project forward of the printed circuit board, coupled to the feed network and the electromechanical phase shifter, wherein ports of the first and second power dividers are provided on the front of the printed circuit board and are configured to feed power to radiators of corresponding radiating elements without jumper cables.

14. The antenna of claim 12, wherein the printed circuit board further comprises an RF input port, an output port, a low pass filter and a first power divider, wherein the first power divider comprises first, second and third ports and conductive traces on the front of the printed circuit board connecting the first port to the second port and the first port to the third port, and wherein the first power divider is coupled to the first end portion of the phase shifting circuit.

15. The antenna of claim 12, wherein each of the first and second outlets merge into a respective power divider by a corresponding conductive trace on the front of the printed circuit board.

16. The antenna of claim 12, wherein the printed circuit board has a length in a longitudinal direction of the antenna a width in a lateral direction of the antenna, wherein the arcuate portion extends in the longitudinal direction along the front of the printed circuit board and projects laterally outward between the first and second end portions, and wherein the arcuate portion is adjacent a central coupling region behind a portion of the wiper arm printed circuit board and also adjacent a power divider with conductive traces on the front of the printed circuit board.

17. The antenna of claim 12, wherein the printed circuit board is provided as a first printed circuit board, the first phase shifting circuit is a first phase shifting circuit, and the wiper printed circuit board is a first wiper printed circuit board, wherein the antenna further comprises:

a second printed circuit board comprising a second phase shifting circuit that is provided on a front of the second printed circuit board; and a second wiper arm printed circuit board that resides in front of the second printed circuit board and cooperates with the second phase shifting circuit.

18. The antenna of claim 17, wherein the first printed circuit board resides adjacent the second printed circuit board, with the second printed circuit board coplanar with the first printed circuit board.

19. The antenna of claim 12, wherein first and second conductive traces on the front of the printed circuit board extend longitudinally in opposing directions from the arcuate portion, wherein the first conductive trace connects to a first port of a first power divider comprising the first port and second and third ports, and wherein the first port is connected to the second port and the third port by a conductive trace segment that bends from the first conductive trace, then splits into first and second conductive trace segments that are parallel and spaced apart to terminate at corresponding second and third ports.

20. An antenna comprising:

at least one feed board having a front surface comprising at least one phase shifting circuit and at least part of a feed network, wherein the at least one phase shifting circuit comprises:

first and second arcuate portions on the front surface that extend in a longitudinal direction and project laterally outward;

a first wiper arm printed circuit board in front of the at least one feed board, pivotably coupled to the first arcuate portion;

a second wiper arm printed circuit board that resides in front of the at least one feed board, pivotably coupled to the second arcuate portion; and a plurality of radiating elements projecting forward of the at least one feed board, wherein an inner end portion of the first wiper arm printed circuit board is adjacent an inner end portion of the second wiper arm printed circuit board.

21. The antenna of claim 20, further comprising a tilt control unit coupled to the first and/or second wiper printed circuit boards.

22. The antenna of claim 20, wherein the first and second arcuate portions each having longitudinally spaced apart first and second end portions defining respective outlets coupled to respective power dividers by conductive connecting traces on the front surface of the at least one feed board, and wherein the respective power dividers are on the front surface of the at least one feed board.

* * * * *